United States Patent [19]

Shimizu

[11] Patent Number: 5,652,632
[45] Date of Patent: Jul. 29, 1997

[54] LCD APPARATUS HAVING ELECTROSTATIC BREAKDOWN PREVENTING CONFIGURATION CAPABLE OF TESTING EACH PIXEL

[75] Inventor: Takeya Shimizu, Tokyo, Japan

[73] Assignee: NEC Corporation, Tokyo, Japan

[21] Appl. No.: 536,174

[22] Filed: Sep. 29, 1995

[30] Foreign Application Priority Data

Sep. 30, 1994  [JP]  Japan ................... 6-261375

[51] Int. Cl.$^6$ ..................... G02F 1/1343
[52] U.S. Cl. ..................... 349/40; 349/54
[58] Field of Search ............ 359/54, 87, 88; 324/770; 349/40, 54

[56] References Cited

U.S. PATENT DOCUMENTS

| | | | |
|---|---|---|---|
| 4,940,934 | 7/1990 | Kawaguchi et al. | 324/770 |
| 5,068,748 | 11/1991 | Ukai et al. | 359/59 |
| 5,220,443 | 6/1993 | Noguchi | 359/59 |
| 5,233,448 | 8/1993 | Wu | 359/59 |
| 5,373,377 | 12/1994 | Ogawa et al. | 359/59 |
| 5,471,329 | 11/1995 | Nakajima et al. | 359/59 |
| 5,497,146 | 3/1996 | Hebiguchi | 359/59 |
| 5,504,348 | 4/1996 | Yoshida et al. | 359/59 |

FOREIGN PATENT DOCUMENTS

| | | | |
|---|---|---|---|
| 62-66231 | 3/1987 | Japan | 359/87 |
| A-3-200121 | 9/1991 | Japan . | |
| 6-222389 | 8/1994 | Japan | 359/59 |

Primary Examiner—William L. Sikes
Assistant Examiner—James A. Dudek
Attorney, Agent, or Firm—Whitham, Curtis, Whitham & McGinn

[57] ABSTRACT

In a thin film transistor type liquid crystal display apparatus including a plurality of driving signal lines, a plurality of data signal lines, a plurality of pixels each connected to one of the driving signal lines and one of the data signal lines, a common driving signal line connected to the driving signal lines, and a common data signal line connected to the data signal lines, a plurality of first resistors are connected between the common driving signal line and the driving signal line, and a plurality of second resistors are connected between said common data signal line and the data signal lines.

8 Claims, 7 Drawing Sheets

LCD APPARATUS HAVING ELECTROSTATIC BREAKDOWN PREVENTING CONFIGURATION CAPABLE OF TESTING EACH PIXEL

BACKGROUND OF THE INVENTION

1. Field of the Invention

The present invention relates to a thin film transistor (TFT) type liquid crystal display (LCD) apparatus having an electrostatic breakdown preventing configuration.

2. Description of the Related Art

An active matrix-type LCD apparatus is thin, making it useful in a variety of display apparatuses. In this active matrix-type LCD apparatus, since individual pixel electrodes are independently driven, the constrast is not reduced based upon the reduction of a duty ratio, and also, the angle of visibility is not reduced, even when the display capacity is increased to increase the number of lines.

In a prior art active matrix-type LCD apparatus, a plurality of driving signal lines along an X direction, a plurality of data signal lines along a Y direction, and a plurality of pixels each connected to one of the driving signal lines and one of the data signal lines are provided. In this case, each pixel is formed by one TFT and a transparent pixel electrode.

Since the TFT is a kind of metal oxide silicon (MOS) transistor, the gate insulating layer thereof may be broken down by static electricity.

In order to avoid the electrostatic breakdown of the gate insulating layers, the driving signal lines are connected to a common driving signal line, and the data signal lines are connected to a common data signal line. The common driving signal line and the common data signal line are grounded. This will be explained later in detail.

In the above-described prior art matrix-type LCD apparatus, however, it is impossible to perform a test upon each pixel to determine whether or not the capacity thereof is normal. For example, in such a test, a voltage is applied to one driving signal line, to turn ON the TFTs connected to the same one driving signal, and simultaneously, a voltage is applied to one data signal line, to write data into one pixel. After a certain time period has passed, a voltage is again applied to the same one driving signal line, to turn ON the TFTs connected to the same one driving signal line, to read the same one pixel. In this case, however, since all the driving signal lines are connected to the common driving signal line and all the data signal lines are connected to the common data signal line, the voltage applied to the same one driving signal lines is also applied to the other driving signal lines, so that it is impossible to turn ON only the TFTs connected to the same one driving signal line, and also, it is impossible to read data from only one data signal line. Thus, it is impossible to detect a defective pixel.

SUMMARY OF THE INVENTION

It is an object of the present invention to be able to test each pixel of an LCD apparatus having a common driving signal line and a common data signal line for avoiding electrostatic breakdown of the TFTs.

According to the present invention, in a thin film transistor type LCD apparatus including a plurality of driving signal lines, a plurality of data signal lines, a plurality of pixels each connected to one of the driving signal lines and one of the data signal lines, a common driving signal line connected to the driving signal lines, and a common data signal line connected to the data signal lines, a plurality of first resistors are connected between the common driving signal line and the driving signal lines, and a plurality of second resistors are connected between said common data signal line and the data signal lines. Thus, in order to perform a test upon one of the pixels, when a voltage is applied to one of the driving signal lines, this voltage is reduced by the first resistors and thus, is not applied to the other driving signal lines. Similarly, when a voltage is applied to one of the data signal lines, this voltage is reduced by the second resistors and thus, is not applied to the other data signal lines.

BRIEF DESCRIPTION OF THE DRAWINGS

The present invention will be more clearly understood from the description as set forth below, as compared with the prior art, with reference to the accompanying drawings, wherein.

DESCRIPTION OF THE PREFERRED EMBODIMENT

Before the description of the preferred embodiments, a prior art active matrix-type LCD apparatus will be explained with reference to FIG. 1.

Figure 1:
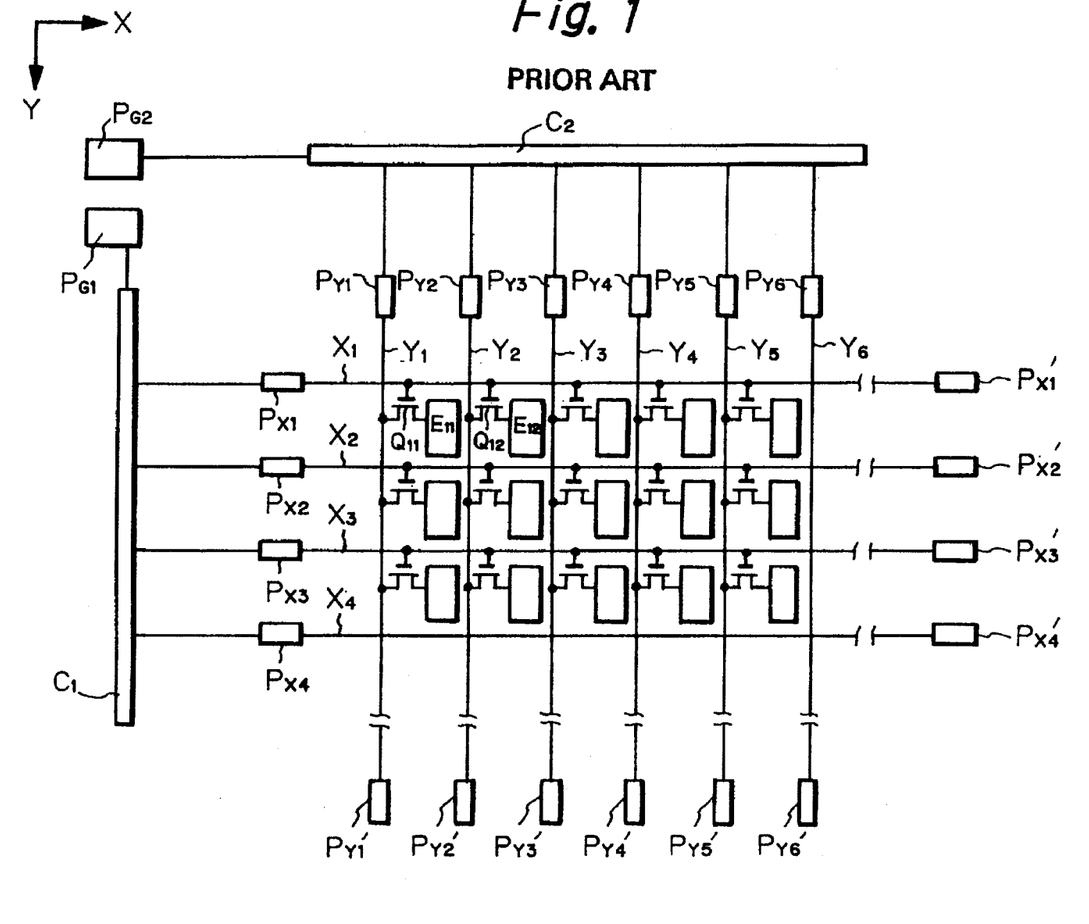
FIG. 1 is a circuit diagram illustrating a prior art active matrix-type LCD apparatus.

In FIG. 1, references $X_1$, $X_2$, . . . designate driving signal lines arranged along an X direction, and $Y_1$, $Y_2$, . . . designate data signal lines arranged along a Y direction. A plurality of TFTs $Q_{11}$, $Q_{12}$, . . . are provided at intersections between the driving signal lines $X_1$, $X_2$, . . . and the driving signal lines $Y_1$, $Y_2$, . . . That is, the TFT $Q_{ij}$ (i, j=1, 2, . . . ) has a gate electrode connected to one of the driving signal lines $X_1$, $X_2$, . . . , a drain electrode connected. to one of the data signal lines $Y_1$, $Y_2$, . . . , and a source electrode connected to a transparent pixel electrode $E_{ij}$.

Driving signal input pads $P_{X^1}$, $P_{X^2}$, . . . are provided on first sides of the driving signal lines $X_1$, $X_2$, . . . , and driving signal measuring pads $P_{X^1}'$, $P_{X^2}'$, . . . are provided on second sides of the driving signal lines $X_1$, $X_2$. Thus, a short-circuited state or a disconnected state of one driving signal lines can be detected by measuring a resistance between one driving signal input pad and its corresponding driving signal measuring pad using probes.

Similarly, data signal input pads $P_{Y^1}$, $P_{Y^2}$, . . . are provided on first sides of the driving signal lines $Y_1$, $Y_2$, . . . , and data signal measuring pads $P_{Y^1}'$, $P_{Y^2}'$, . . . are provided on second sides of the driving signal lines $Y_1$, $Y_2$. Thus, a short-circuited state or a disconnected state of one data signal line can be detected by measuring a resistance between one data signal input pad and its corresponding data signal measuring pad using probes.

The driving signal lines $X_1$, $X_2$, . . . are connected to a common driving signal line $C_1$ which is connected to a ground pad $P_G^1$. Similarly, the data signal lines $Y_1$, $Y_2$, . . . are connected to a common data signal line $C_2$ which is connected to a ground pad $P_{G^2}$. Thus, during the manufacturing steps of the device of FIG. 1, when the ground pads $P_{G^1}$ and $P_{G^2}$ are grounded, the electrostatic breakdown of gate insulating layers of the TFT $Q_{ij}$ can be avoided.

In the apparatus of FIG. 1, in order to test the capacity of a pixel electrode such as $E_{11}$, when a first voltage is applied from the driving signal input pad $X_{X^1}$ to the driving signal line $X_1$ and a second voltage is applied from the data signal input pad $P_{Y^1}$ to the data signal line $Y_1$ to thereby write data into the pixel electrode $E_{11}$, the first voltage is applied via the common driving signal line $C_1$ to the other driving signal lines $X_2$, $X_3$, ..., and the second voltage is applied via the common data signal line $C_2$ to the other data signal lines $Y_2$, $Y_3$, ... Conversely, when a voltage is applied from the driving signal input pad $P_{X^1}$ to the driving signal line $X_1$ to thereby read the data of the pixel electrode $E_{11}$, from the data signal input pad $P_{Y^1}$ via the data signal line $Y_1$, the voltage is applied via the common driving signal line $C_1$ to the other driving signal lines $X_2$, $X_3$, ..., and it is impossible to derive a voltage peculiar to the data signal input pad $P_{Y^1}$. Thus, it is impossible to detect a defective pixel.

Figure 2:
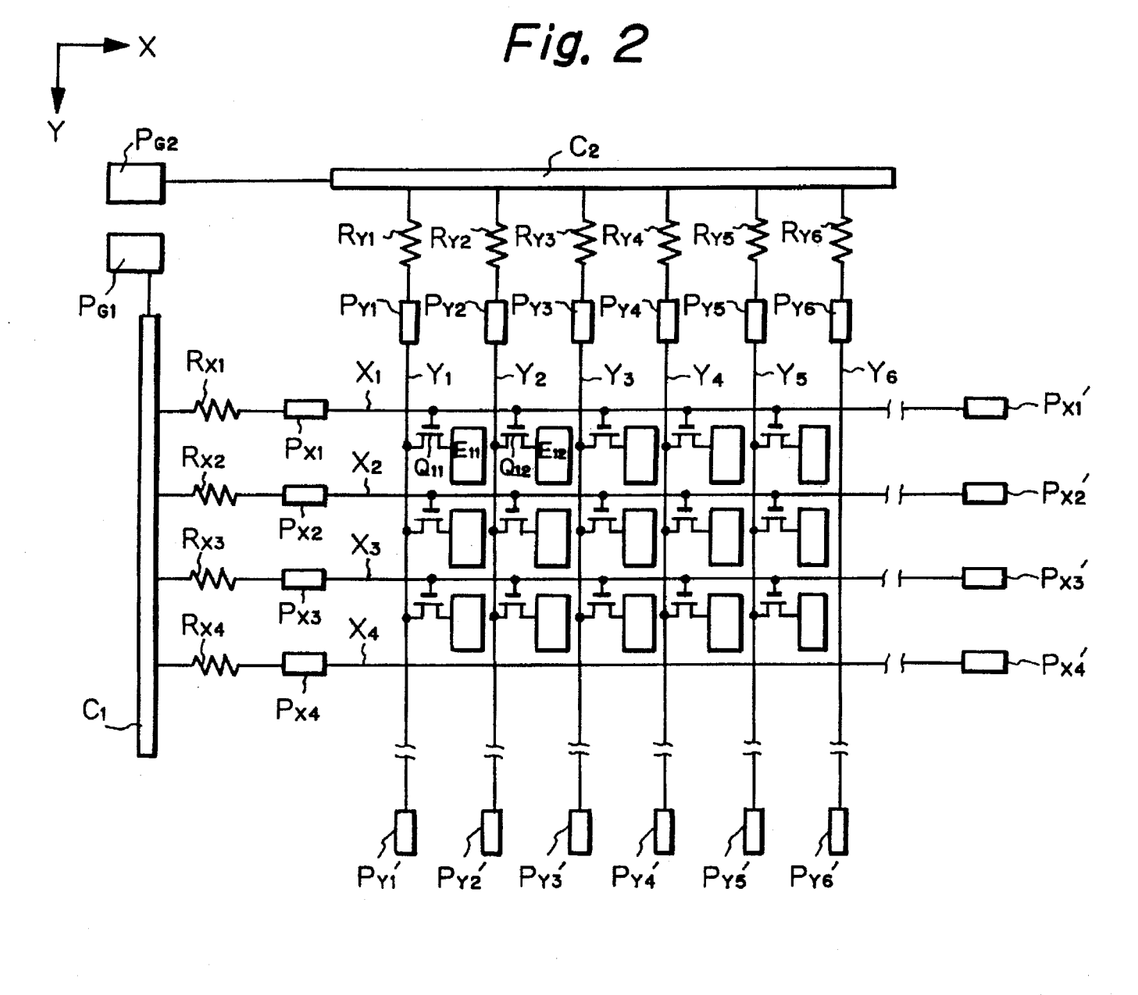
FIG. 2 is a circuit diagram illustrating an embodiment of the active matrix-type LCD apparatus according to the present invention.

In FIG. 2, which illustrates an embodiment of the present invention, resistors $R_{X^1}$, $R_{X^2}$, ... are interposed between the common driving signal line $C_1$ and the driving signal input pads $P_{X^1}$, $P_{X^2}$, ..., and resistors $R_{Y^1}$, $R_{Y^2}$, ... are interposed between the common data signal line $C_2$ and the data signal input pads $P_{Y^1}$, $P_{Y^2}$, ... The values of the resistors $R_{X^1}$, $R_{X^2}$, ..., $R_{Y^1}$, $R_{Y^2}$, ... can be arbitrarily determined; however, are preferably some kΩ to hundreds of kΩ.

In the apparatus of FIG. 1, in order to test the capacity of the pixel electrode such as $E_{11}$, when a first voltage is applied from the driving signal input pad $P_{X^1}$ to the driving signal line $X_1$ and a second voltage is applied from the data signal input pad $P_{Y^1}$ to the data signal line $Y_1$ to thereby write data into the pixel electrode $E_{11}$, the first voltage is reduced by the resistors $R_{X^1}$, $R_{X^2}$, ..., and is hardly applied to the other driving signal lines $X_2$, $X_3$, ..., and the second voltage is reduced by the resistors $R_{Y^1}$, $R_{Y^2}$, ..., and is hardly applied to the other data signal lines $Y_2$, $Y_3$, ... Conversely, when a voltage is applied from the driving signal input pad $P_{X^1}$ to the driving signal line $X_1$ to thereby read the data of the pixel electrode $E_{11}$, from the data signal input pad $P_{Y^1}$ via the data signal line $Y_1$, the voltage is also reduced by the resistors $R_{X^1}$, $R_{X^2}$, ..., and is hardly applied to the other driving signal lines $X_2$, $X_3$, ..., and the voltage at the data signal input pad $P_{Y^1}$ is hardly affected by the voltages at the other data signal input pads $P_{Y^1}$, $P_{Y^2}$, ... due to the resistors $R_{Y^1}$, $R_{Y^2}$, ... Thus, it is possible to derive a voltage peculiar to the data signal input pad $P_{Y^1}$, thereby detecting a defective pixel.

The manufacturing steps of the apparatus of FIG. 2 are explained next with reference to FIGS. 3A, 3B, 4A, 4B, 5A, 5B, 6A, 6B, 7A and 7B. Note that FIGS. 3A, 4A, 5A, 6A and 7A are plan views illustrating the common driving signal line $C_1$ (the common data signal line $C_2$), the driving signal pad $P_{xi}$ (the data signal pad $P_{yj}$) and the resistor $R_{xi}$ (the resistor $R_{yj}$) of FIG. 2, and FIGS. 3B, 4B, 5B, 6B and 7B are cross-sectional views illustrating one pixel formed by the TFT $Q_{ij}$ and the transparent pixel electrode $E_{ij}$ of FIG. 2.

Figure 3A:
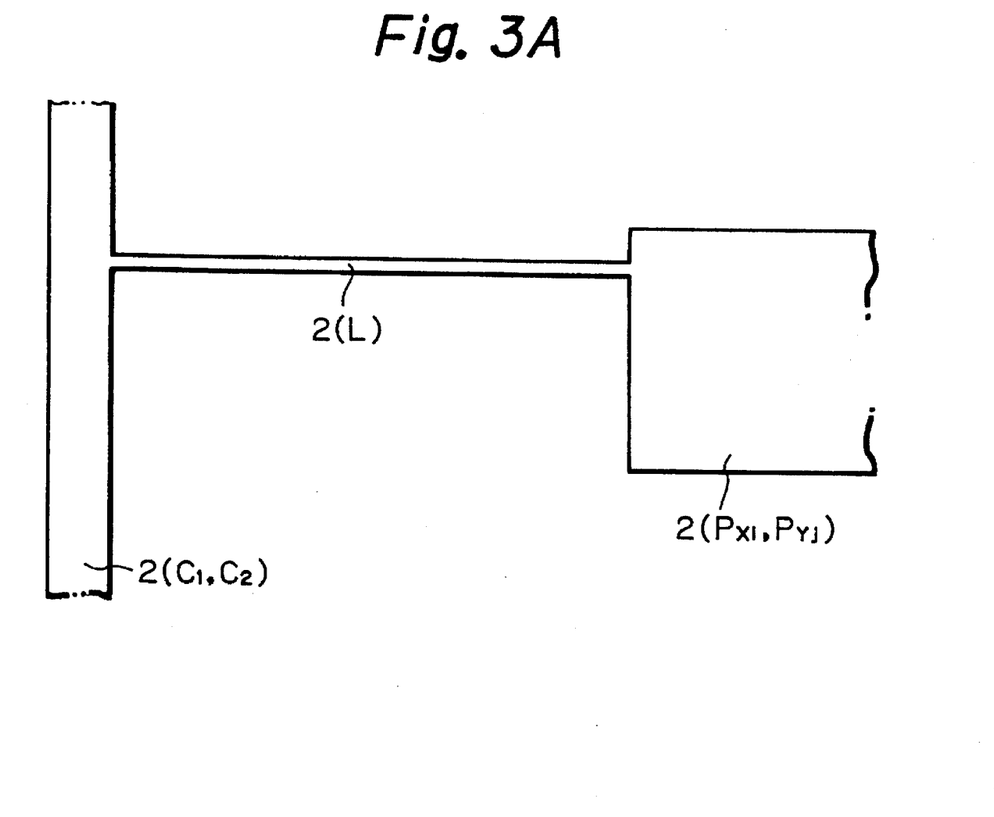
FIGS. 3A, 4A, 5A, 6A and 7A are plan views for explaining the manufacturing steps of the apparatus of FIG. 2.
Figure 3B:
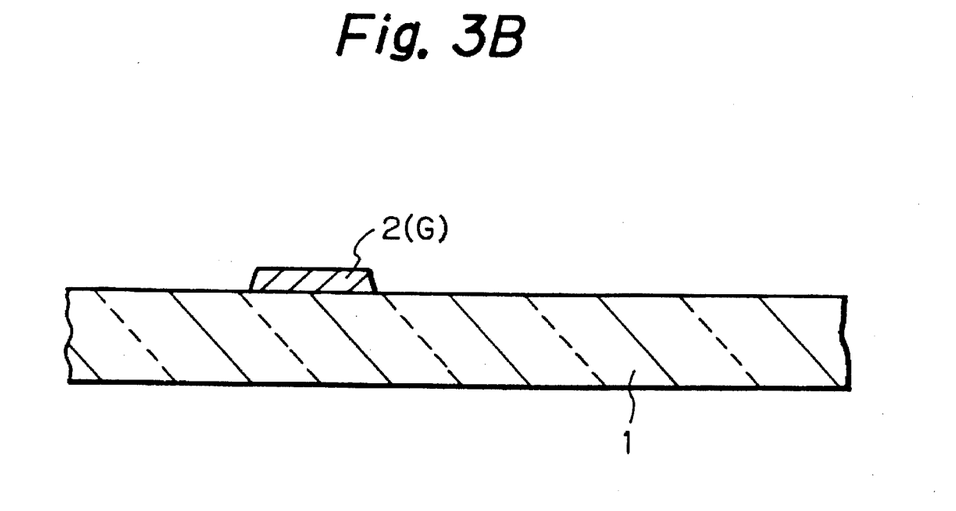
FIGS. 3B, 4B, 5B, 6B and 7B are cross-sectional views for explaining the manufacturing steps of the apparatus of FIG. 2.

First, referring to FIGS. 3A and 3B, a Cr layer 2 is deposited by a sputtering process on a glass substrate 1, and is patterned by a photolithography and wet process to form the common driving signal line $C_1$ (the common data signal line $C_2$) and the driving signal input pad $P_{xi}$ (the data signal input pad $P_{yj}$), as well as the gate electrode G of the TFT $Q_{ij}$. In this state, the common driving signal line $C_1$ (the common data signal line $C_2$) is electrically connected to the driving signal line $P_{xi}$ (the data signal line $P_{yj}$) by a link portion 2 (L).

Figure 4A:
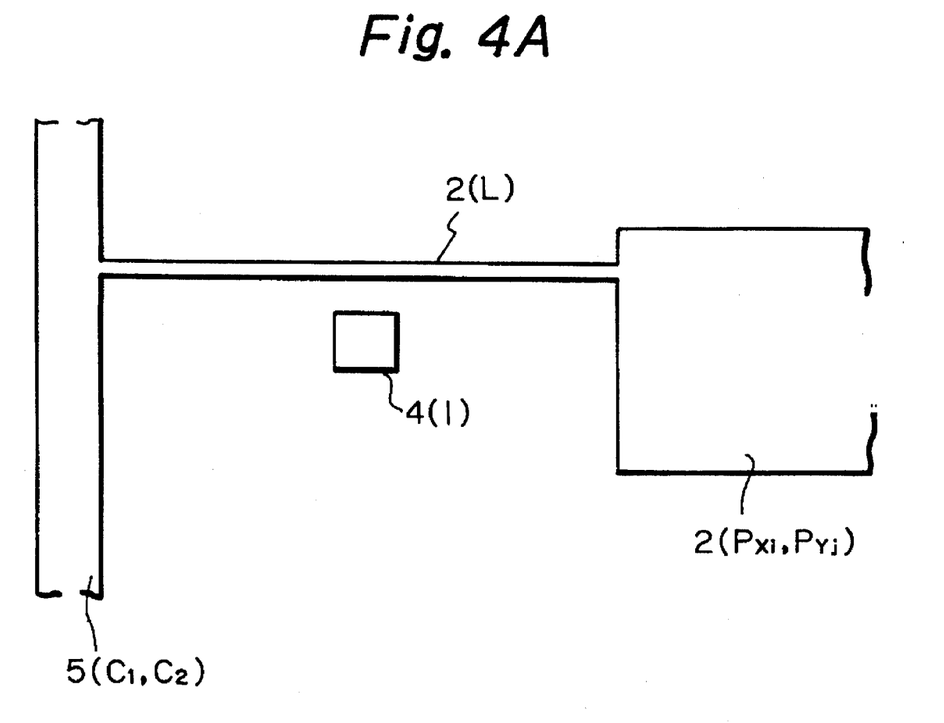
Figure 4B:
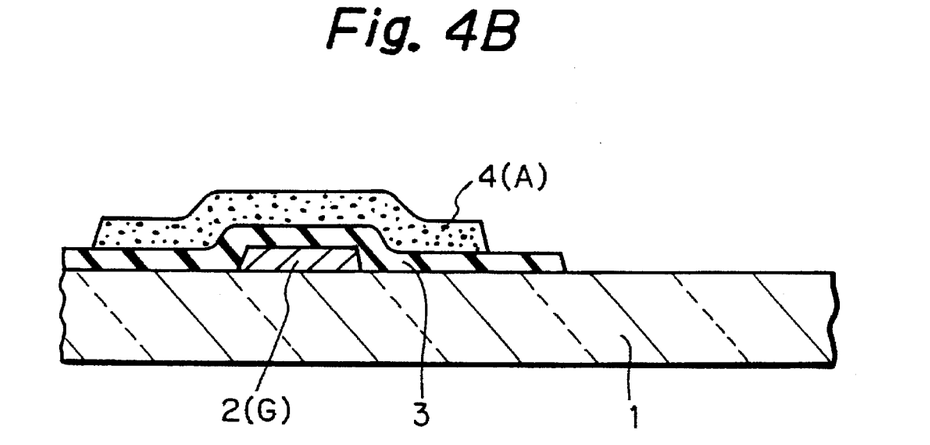

Next, referring to FIGS. 4A and 4B, a silicon nitride layer is deposited by a plasma chemical vapor deposition (CVD) process and is patterned by a photolithography and wet process to form a gate insulating layer 3 of the TFT $Q_{ij}$. After that, an $N^+$-type amorphous silicon layer 4 is formed by a plasma CVD process, and is patterned to form an island 4 (I) between the common driving signal line $C_1$ (the common data signal line $C_2$) and the driving signal pad $P_{xi}$ (the data signal pad $P_{yj}$) as well as an active semiconductor layer 4 (A) of the TFT $Q_{ij}$.

Figure 5A:
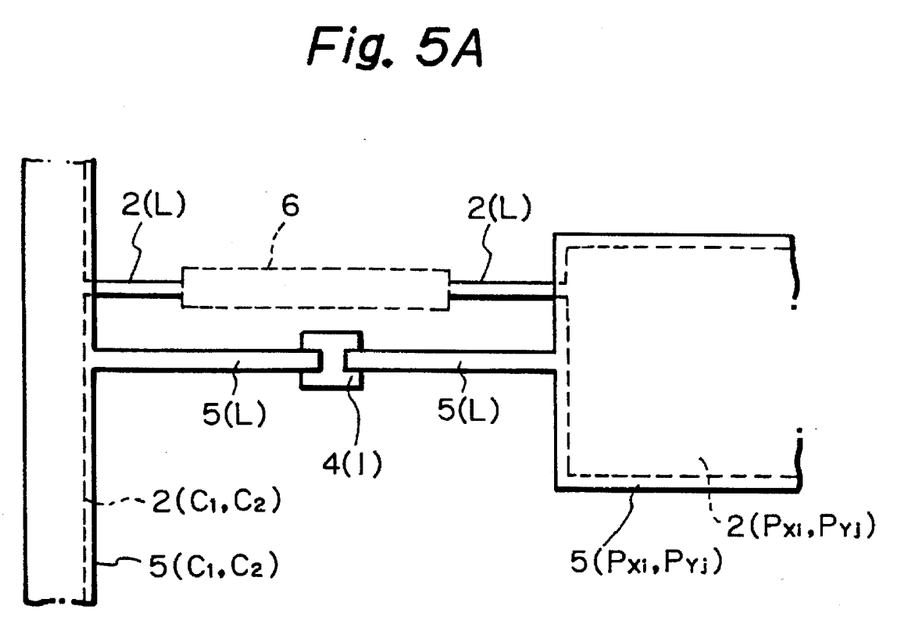
Figure 5B:
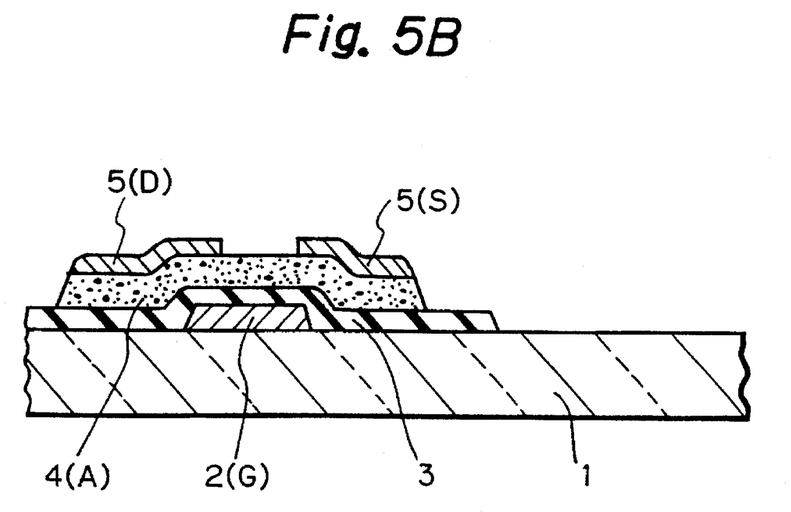

Next, referring to FIGS. 5A and 5B, a Cr layer 5 is deposited by a sputtering process, and is patterned by a photolithography and wet process to form the common driving signal line $C_1$ (the common data signal line $C_2$) and the driving signal input pad $P_{xi}$ (the data signal input pad $P_{yj}$), as well as the source electrode S and the drain electrode D of the TFT $Q_{ij}$. In this state, the common driving signal line $C_1$ (the common data signal line $C_2$) is electrically connected to the driving signal line $P_{xi}$ (the data signal line $P_{yj}$) by two link portions 5 (L) which are coupled by the island 4 (I).

Simultaneously, the link portion 2 (L) is etched to form a hole 6, so that the link portion 2 (L) is electrically disconnected.

Figure 6A:
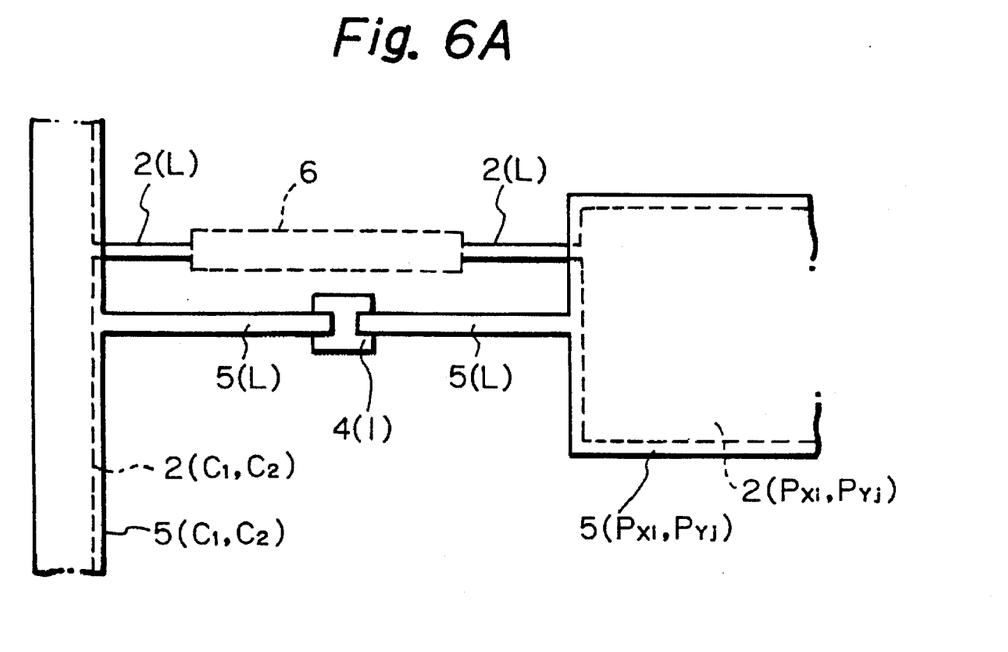
Figure 6B:
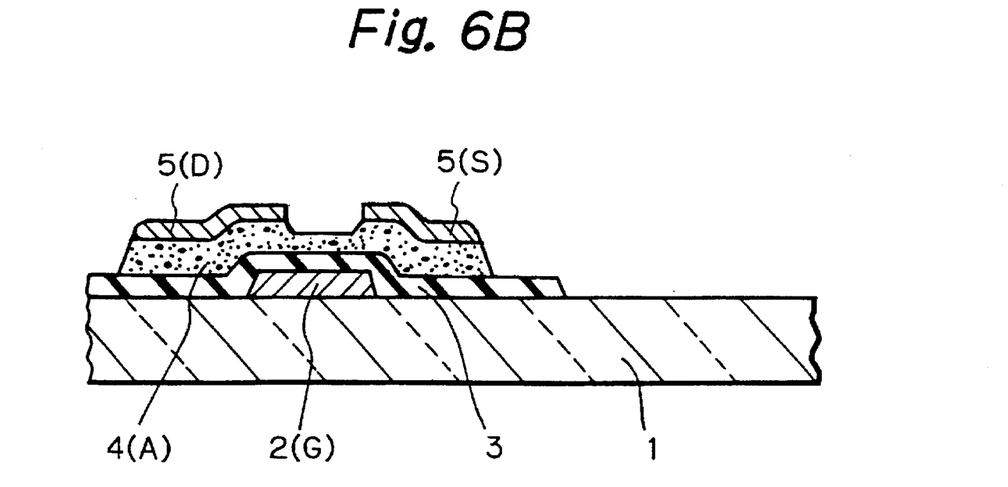

Next, referring to FIGS. 6A and 6B, the active semiconductor layer 4 (A) and the island 4 (I) are partly etched with a mask of the Cr layers 5 (S), 5 (D) and 5 (L), to thereby increase the resistances of the active semiconductor layer 4 (A) and the island 4 (I).

Figure 7A:
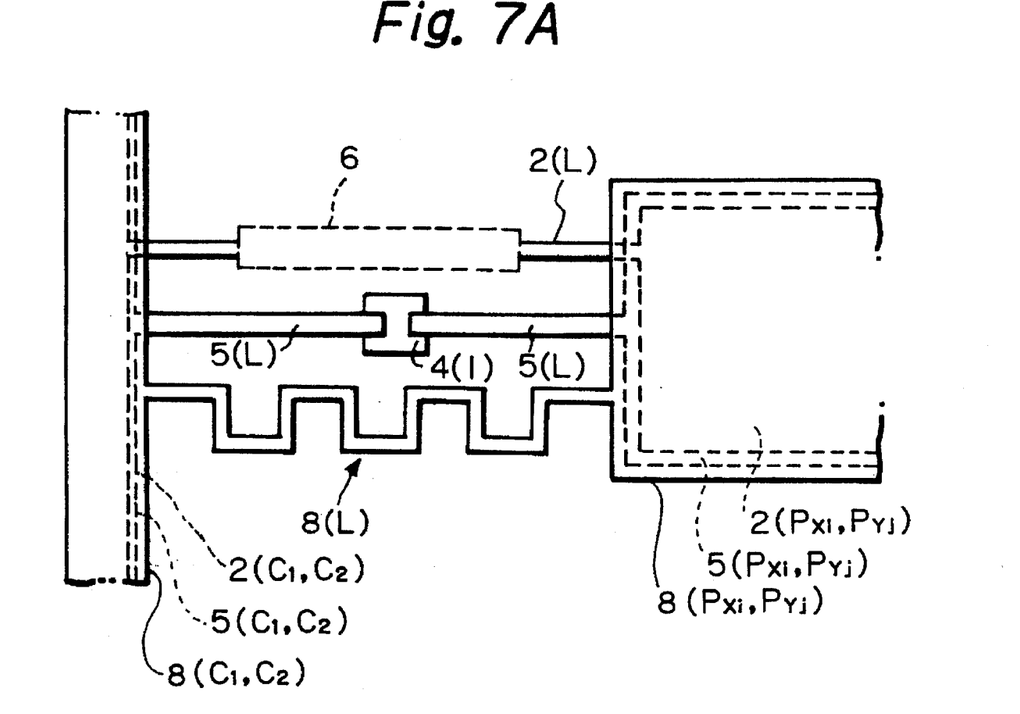
Figure 7B:
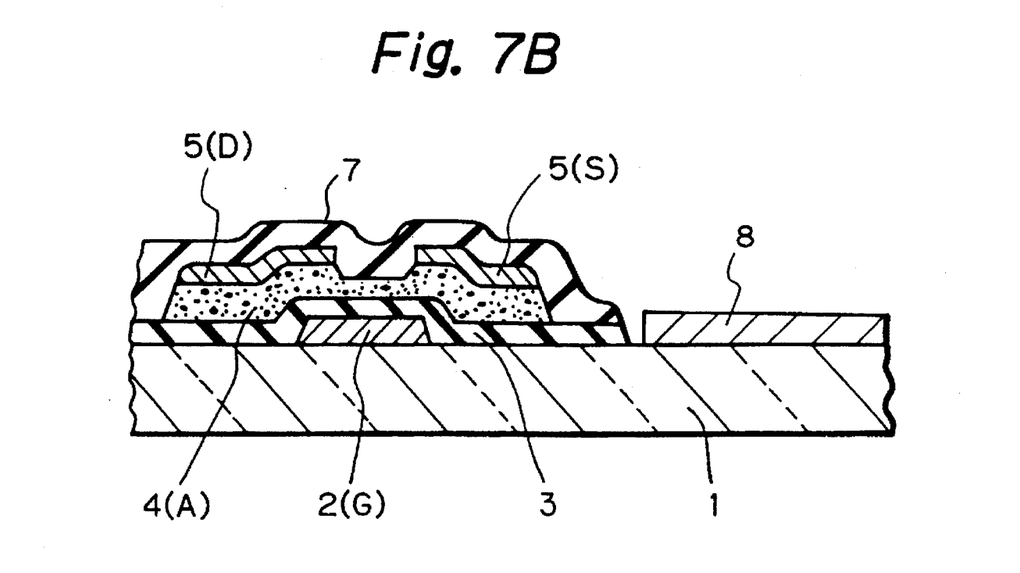

Finally, referring to FIGS. 7A and 7B, an insulating layer 7 is formed by a CVD process and is patterned by a photolithography process to cover the source electrode S and the drain electrode D. Then, an indium tin oxide (ITO) layer 8 is deposited by a sputtering process and is patterned by a photolithography and wet process to form the common driving signal line $C_1$ (the common data signal line $C_2$) and the driving signal input pad $P_{xi}$ (the data signal input pad $P_{yj}$), as well as the pixel electrode $E_{ij}$. In this state, the common driving signal line $C_1$ (the common data signal line $C_2$) is electrically connected to the driving signal line $P_{xi}$ (the data signal line $P_{yj}$) by a link portion 8 (L). The link portion 8 (L) is so zigzagged as to obtain a desired resistance.

Since the resistance of the island 4 (I) is relatively large, each of the resistors $R_{X^1}$, $R_{X^2}$, ..., $R_{Y^1}$, $R_{Y^2}$, ... is substantially determined by the link portion 8 (L) which is made of the same material as that of the pixel electrode $E_{ij}$.

As explained hereinbefore, according to the present invention, in an active matrix-type LCD apparatus having a common driving signal line connected to driving signal lines and a common data signal line connected to data signal lines for avoiding electrostatic breakdown of TFTs, since resistors are interposed between the common driving signal line and the driving signal lines and between the common data signal lines and the data signal lines, a test can be performed upon each pixel.

I claim:

1. A thin film transistor type liquid crystal display apparatus comprising:

a plurality of driving signal lines;

a plurality of data signal lines;

a plurality of pixels, each connected to one of said driving signal lines and one of data signal lines;

a common driving signal line connected to said driving signal lines;

a common data signal line connected to said data signal lines;

a plurality of first resistors, each connected between said common driving signal line and a respective one of said driving signal lines;

a plurality of second resistors, each connected between said common data signal line and a respective one of said data signal lines;

a plurality of driving signal input pads, each connected between one of said driving signal lines and one of said first resistors; and a plurality of data signal input pads, each connected between one of said data lines and one of said second resistors, wherein each of said pixels comprises a pixel electrode, and wherein said pixel electrodes, said first resistors and said second resistors are formed of the same material.

2. An apparatus as set forth in claim 1, wherein said same material is indium tin oxide.

3. An apparatus as set forth in claim 1, further comprising:

a first ground pad connected to said common driving signal line; and a second ground pad connected to said common data signal line.

4. An apparatus as set forth in claim 1, wherein each of said first and second resistors is zigzagged.

5. A thin film transistor type liquid crystal display apparatus comprising:

a transparent insulating substrate;

a first conductive pattern, formed on said transparent insulating substrate, for defining driving signal input pads, a common driving signal line, data signal input pads, a common data signal line, and gate electrodes of thin film transistors of pixels;

a first insulating layer formed on said gate electrodes;

a semiconductor layer, formed on said first insulating layer, for defining first islands between said driving signal input pads and said common driving signal line, second islands between said data signal input pads and said common data signal line and active layers of said thin film transistors;

a second conductive layer, formed on said first conductive layer and said semiconductor layer, for defining said driving signal input pads, said common driving signal line connected via said first islands to said driving signal input pads, said data signal input pads said common data signal line connected via said second islands to said data signal input pads, and source electrodes and drain electrodes of said thin film transistors;

a second insulating layer formed on said active layers, said source electrodes and said drain electrodes; and a third conductive layer, formed on said second conductive layer and said transparent insulating substrate, for defining said driving signal input pads, said common driving signal line connected to said driving signal input pads, said data signal input pads, said common data signal line connected to said data signal input pads, and pixel electrodes of said pixels.

6. An apparatus as set forth in claim 5, wherein said third conductive layer between said driving signal input pads and said common driving signal line and between said data signal input pads and said common driving signal line is zigzagged.

7. A method for manufacturing a thin film transistor type liquid crystal display apparatus including a plurality of driving signal lines, a plurality of data signal lines, a plurality of pixels formed by thin film transistors and pixel electrodes at intersections between said driving signal lines and said data signal lines, comprising the steps of:

forming a first conductive layer on a glass insulating substrate, said first conductive layer defining driving signal input pads connected to said driving signal lines, a common driving signal line connected to said driving signal lines, data signal input pads connected to said data signal lines, a common data signal lines connected to said data signal line, and a gate electrode of said thin film transistors;

forming a semiconductor layer over said first conductive layer and said first conductive layer, said semiconductor layer defining first islands between said driving signal input pads and said common driving signal line, second islands between said data signal input pads and said common data signal line, and active layers of said thin film transistors;

forming a second conductive layer on said first conductive layer and said semiconductor layer, said second conductive layer defining link portions linked via said first islands between said driving signal input pads and said common driving signal line and linked via said second islands between said data signal input pads and said common data signal line source electrodes and drain electrodes of said thin film transistors;

removing link portions of said first conductive layer between said driving signal input pads and said common driving signal line and link portions between said data signal input pads and said common data signal line;

partly removing said semiconductor layer to increase resistance of said first and second islands and to change said active layers into channel regions; and forming a third conductive layer on said second conductive layer and said transparent insulating substrate, said third conductive layer defining link portions between said driving signal input pads and said common driving signal line and link portions between said data signal input pads and said common data signal line, and defining said pixel electrodes.

8. A method as set forth in claim 7, wherein said link portions of said third conductive layer are zigzagged.

* * * * *